United States Patent
Ding et al.

(10) Patent No.: US 9,933,316 B2
(45) Date of Patent: Apr. 3, 2018

(54) THERMAL SENSOR

(71) Applicant: Kidde Technologies, Inc., Wilson, NC (US)

(72) Inventors: Zhongfen Ding, South Windsor, CT (US); Jonathan Rheaume, West Hartford, CT (US); Theresa Hugener-Campbell, Coventry, CT (US)

(73) Assignee: Kidde Technologies, Inc., Wilson, NC (US)

(*) Notice: Subject to any disclaimer, the term of this patent is extended or adjusted under 35 U.S.C. 154(b) by 60 days.

(21) Appl. No.: 14/308,214

(22) Filed: Jun. 18, 2014

(65) Prior Publication Data
US 2015/0369673 A1 Dec. 24, 2015

(51) Int. Cl.
*G01K 7/16* (2006.01)
*G01M 99/00* (2011.01)
*G01K 3/00* (2006.01)
*G01K 11/06* (2006.01)

(52) U.S. Cl.
CPC ............... *G01K 7/16* (2013.01); *G01K 3/005* (2013.01); *G01K 11/06* (2013.01); *G01M 99/002* (2013.01)

(58) Field of Classification Search
CPC .............. B82Y 10/00; H01L 21/28273; H01L 21/28282; H01L 29/42332; H01L 27/792
See application file for complete search history.

(56) References Cited

U.S. PATENT DOCUMENTS

| | | | | |
|---|---|---|---|---|
| 5,793,293 A | * | 8/1998 | Melamud ............... | G01K 3/005 340/511 |
| 8,921,473 B1 | * | 12/2014 | Hyman .................... | C08K 3/04 423/445 R |
| 2002/0140527 A1 | * | 10/2002 | Shamsaifar ............. | H01P 1/207 333/202 |
| 2012/0048768 A1 | * | 3/2012 | Holloway ............... | C09K 5/063 206/524.1 |
| 2012/0264022 A1 | * | 10/2012 | Hosoe .................... | H01G 9/016 429/245 |

* cited by examiner

*Primary Examiner* — Fernando L. Toledo
*Assistant Examiner* — Lawrence-Linh T Nguyen
(74) *Attorney, Agent, or Firm* — Locke Lord LLP; Daniel J. Fiorello; Scott D. Wofsy

(57) ABSTRACT

A thermal sensor for an aircraft includes a first electrode, a second electrode, a support layer disposed between the first electrode and the second electrode, and a state changing material is configured to disposed within the support layer, wherein the state changing material transitions between a non-conductive state to a conductive state at a threshold temperature to electrically connect the first and second electrodes.

5 Claims, 1 Drawing Sheet

Fig. 1
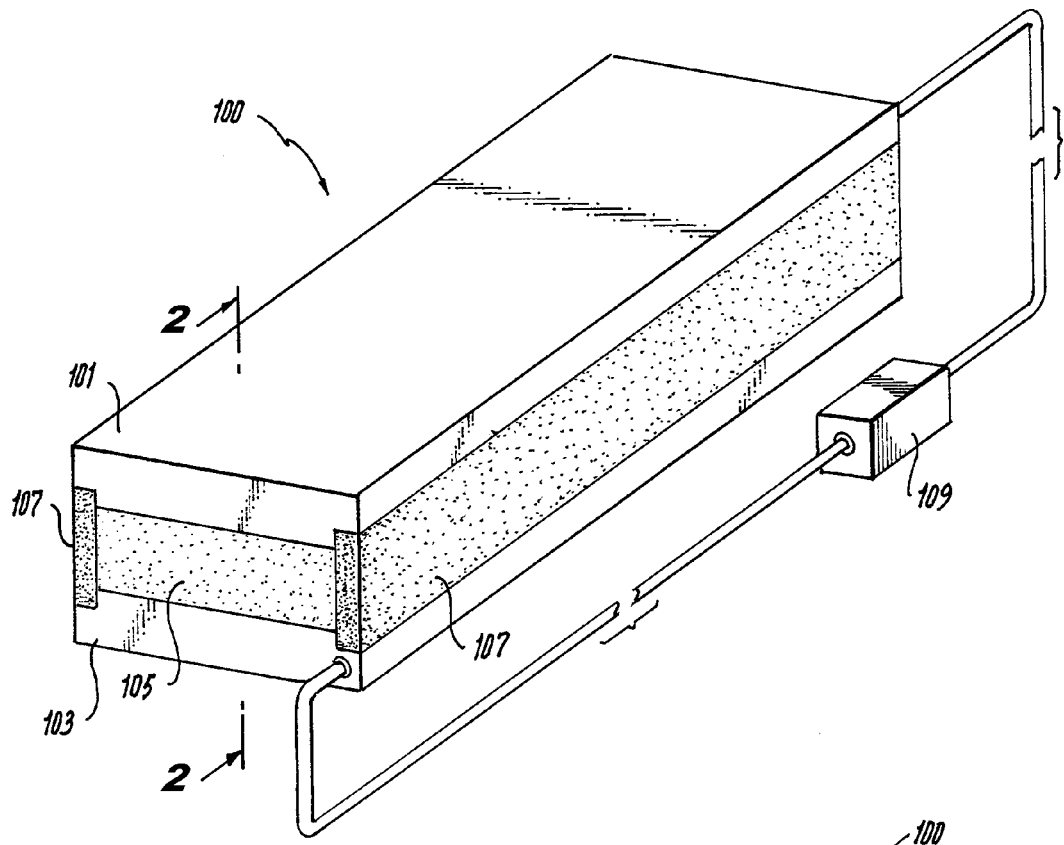
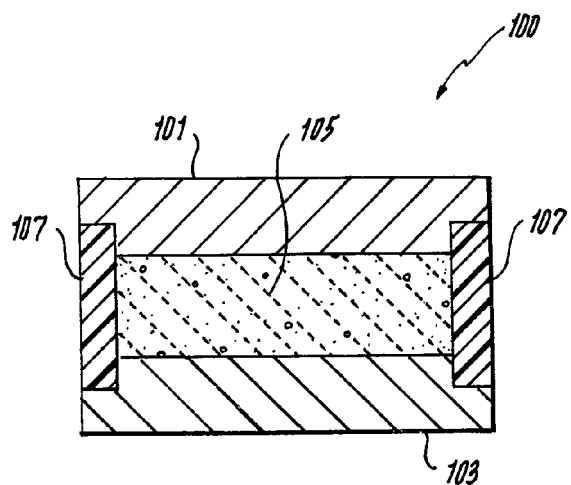
Fig. 2

THERMAL SENSOR

BACKGROUND

1. Field

The present disclosure relates to thermal sensors, more particularly to continuous thermal/overheat sensing in aircraft and in vehicles.

2. Description of Related Art

Thermal sensing in aircraft components (e.g., a hot air duct from an engine for environmental control) can utilize heat-sensing elements disposed therein for monitoring the components for overheating. Current duct leak overheat detection systems (DLODS) use a nickel-containing inner core electrode and an Inconel 625 outer sheath electrode separated by a granular, porous ceramic or glass layer. This granular, porous ceramic layer is filled with a salt mixture and acts as an electrical barrier between electrodes when exposed below a threshold temperature. The salt mixture melts at a threshold temperature and causes electrical connection between the inner electrode and the outer electrode such that the salt mixture is a heat-sensing element.

Such conventional methods and systems have generally been considered satisfactory for their intended purpose. However, there is still a need in the art for improved thermal sensors. For aircraft with polymer composite components, the overheat sensing needs to react at lower temperature with faster response. The present disclosure provides a solution for this need.

SUMMARY

In at least one aspect of this disclosure, a thermal sensor for an aircraft includes a first electrode, a second electrode, a support layer disposed between the first electrode and the second electrode, and a state changing material is configured to disposed within the support layer, wherein the state changing material transitions between a non-conductive state to a conductive state at a threshold temperature to electrically connect the first and second electrodes. The support layer could be an independent entity or a part of an electrode. For example, two electrodes can be stainless steel, aluminum, or another conducting material. The support layer can be an anodized layer on at least one interior surface of one electrode. The phase changing material is deposited so that the phase changing material is in partial contact with the anodized and non-anodized electrode surface. Upon reaching the critical sensor temperature, the phase changing material converts from a solid to a liquid and completes an electrical connection which results in a sensor output.

At least one of the first and second electrodes can be a plate electrode. The first and second electrodes can be made of aluminum or any other suitable material. The support layer could include a granular ceramic, glass, or a granular high temperature polymer. The support layer can be an anodized layer of one of the first and second electrodes. The form of the granular ceramic or polymer may exist as a mesh, fibers, or membrane structure. Suitable ceramic materials include non-conducting metal oxides such as alumina, and glass. The high temperature polymer can include at least one of polytetrafluoroethylene (PTFE), polyetheretherketone (PEEK), polyetherimide (PEI), polyphenylsulfone (PPSU), or polysulfone (PSU).

The state changing material can include a eutectic salt, a salt mixture, a conducting polymer film, and/or any other suitable phase/state changing material. The salt can include, for example, any suitable chemical mixture of nitrate salts having lithium, sodium and potassium cations and a lesser amount of nitrite salt that may contain one or more cations that include lithium, sodium and potassium. The desired amount of nitrite species ranges from about 1% by weight to about 15% by weight. An example salt includes a ratio: $LiNO_3:NaNO_3:KNO_3:NaNO_2$. Salts can include suitable compositions, e.g., $CsNO_3$. $Ca(NO_3)_2$, $NaCl$, $ZnSO_4$, $KI$, $SnCL_2$, $NH_4Cl$, and/or $MgCl$.

The state changing material can be sandwiched between the first electrode and the second electrode, e.g., wherein the state changing material is sealed in between the first electrode and the second electrode by a sealant. The sealant can include a perfluoro-elastomer or any other suitable material.

In at least one aspect of this present disclosure, a method for manufacturing a thermal sensor includes dip coating a support layer using a molten state changing material, disposing a first and second aluminum plate electrodes on the support layer after dip coating, and sealing the support layer between the first and second aluminum plate electrodes. Dip coating can include dip coating the support layer in a molten eutectic salt.

Sealing the support layer can include disposing a sealant on an exposed edge of the support layer and hot pressing the sealant. The method can further include hot pressing the first and second electrodes, the support layer, and the sealant together into a sandwich.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a perspective, cross-sectional view of an embodiment of a thermal sensor in accordance with this disclosure, showing the thermal sensor electrically connected to a signal processing device; and FIG. 2 is a partial perspective view of the embodiment of a thermal sensor of FIG. 1 showing the sealant.

DETAILED DESCRIPTION

Reference will now be made to the drawings wherein like reference numerals identify similar structural features or aspects of the subject disclosure. For purposes of explanation and illustration, and not limitation, a perspective view an embodiment of the thermal sensor in accordance with the disclosure is shown in FIGS. 1 and 2, and is designated generally by reference character 100. The systems and methods described herein can be used to sense a temperature or indicate a threshold temperature, e.g., in an aircraft component and/or system.

A thermal sensor 100 includes a first electrode 101, a second electrode 103, and a support layer 105 disposed between the first electrode 101 and the second electrode 103. A state changing material is disposed within the support layer 105 such that the state changing material transitions between a non-conductive state to a conductive state at a threshold temperature to allow conduction between the first electrode 101 and the second electrode 103 above the threshold temperature.

As shown, one or both of the first and second electrodes 101, 103 can be plate electrodes or be manufactured to any other suitable shape. The first and second electrodes 101, 103 can also be made of aluminum or any other suitable material.

In some embodiments, the support layer 105 could include a granular ceramic, glass or a granular high temperature polymer. The form of the granular ceramic or polymer may exist as a mesh, fibers, or membrane structure. A suitable polymeric material includes high temperature polytetrafluoroethylene (PTFE), and suitable ceramic materials include non-conducting metal oxides such as alumina, and glass. In other embodiments, the support layer 105 can include any other suitable porous material.

The support layer 105 can be an anodized layer of one of the first and second electrodes 101, 103 (e.g., anodized aluminum layer $Al_2O_3$) or any other suitable oxidized layer. In at least some embodiments, the state changing material can include a salt mixture. In such embodiments, the anodized layer characteristics can be selected to achieve a desired impedance and/or resistance of the sensor 100 when energy is applied to the sensor. For example, the morphology, thickness, porosity, or other properties can be modified to change the electrical and physical characteristics of the sensor 100. In some embodiments, the thickness of the support layer 105 is about 25 micrometers (about 0.001 inches).

The state changing material can include a eutectic salt, a salt mixture, a conducting polymer film, and/or any other suitable phase/state changing material. The salt can include, for example, any suitable chemical mixture of nitrate salts having lithium, sodium and potassium cations and a lesser amount of nitrite salt that may contain one or more cations that include lithium, sodium and potassium. The desired amount of nitrite species ranges from about 1% by weight to about 15% by weight.

In some embodiments, the salt mixture can include a chemical ratio of $LiNO_3:NaNO_3:KNO_3:NaNO_2$. In some embodiments, salt compositions can include any suitable compositions, e.g., $CsNO_3$, $Ca(NO_3)_2$, $NaCl$, $ZnSO_4$, $KI$, $SnCL_2$, $NH_4Cl$, and/or $MgCl$. The state changing material 107 (e.g., a salt mixture, a eutectic salt mixture) can be selected to provide a melting temperature at a desired threshold temperature (e.g., about 99.5 degrees Celcius for the above ratio).

As shown, the state changing material can be sandwiched between the first electrode 101 and the second electrode 103 and sealed in between the first electrode 101 and the second electrode 103 by a sealant 107 sealing around the periphery of sensor 100. The sealant 107 can include a perfluoroelastomer or any other suitable high temperature sealant that has a melting temperature above the state change material.

The sensor 100 can be electrically connected to a signal processing system 109 configured to determine an impedance, resistance, voltage, current, or other electrical characteristic of the sensor 100. As shown, the first electrode 101 and the second electrode 103 can be electrically connected to the signal processing system 109 in any suitable means. The signal processing system 109 can include any suitable circuitry hardware, software, and/or the like for receiving and/or processing electrical signals.

As described above, the sensor 100 can be used to determine temperature (e.g., through impedance measurements or other suitable electrical analysis) and/or that a temperature threshold has been exceeded because below a threshold temperature, the support layer 105 acts as the electrical insulator between the state change material and one or both of the electrodes such that an electrical signal is prevented from passing therethrough. When the threshold temperature is reached or exceeded, the state change material melts and closes the circuit between the first electrode 101 and the second electrode 103. Signal processing system 109 can determine when this occurs and signal a suitable system (e.g., an on-board computer) or any other suitable indicator to indicate that a temperature where the sensor 100 is located exceeds the threshold temperature.

Due to the flat shape and/or the use of lighter electrode material, the sensor 100 can be thinner and lighter than conventional sensors. Also, the sensor 100 can be mounted to (e.g., via high temperature bonding) or positioned in an aircraft system (e.g. proximal to a duct) e.g., by facing the flat side toward a hot air duct wall, thereby increasing the surface area for heat transfer relative to the conventional tubular geometry and thus reducing the response time of the sensor 100. Since many overheat detection sensors are used in a traditional commercial aircraft, it is envisioned that using a sensor 100 as disclosed herein can reduce the weight of an aircraft on the order of tens of pounds for example. In addition, some embodiments of the disclosed sensor may exhibit high geometric flexibility than conventional sensors on account of the materials of construction, allowing the continuous sensor to be conformed to the shape of a duct without risk of cracking or damaging the support layer that renders the sensor inoperable.

In at least one aspect of this present disclosure, a method for manufacturing a thermal sensor 100 includes dip coating a support layer 105 using a molten state changing material, disposing a first and second electrodes 101, 103 on the support layer 105 after dip coating, and sealing the support layer between the first and second electrodes 101, 103. Dip coating can include dip coating the support layer 105 in a molten eutectic salt.

Sealing the support layer 105 can further include disposing a sealant 107 on an exposed edge of the support layer 105 and hot pressing the sealant 107. The method can further include hot pressing the first and second electrodes 101, 103, the support layer 105, and the sealant 107 together into a sandwich.

The methods, devices, and systems of the present disclosure, as described above and shown in the drawings, provide for a thermal sensor with superior properties including lighter weight and faster response time. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for manufacturing a thermal/overheat sensor, comprising:
    dip coating a support layer using a molten state changing material;
    disposing a first and second aluminum plate electrodes on the support layer after dip coating, wherein dip coating includes dip coating the support layer in a molten or aqueous salt mixture; and
    sealing the support layer between the first and second aluminum plate electrodes.

2. The method of claim 1, wherein sealing the support layer includes disposing a sealant on an exposed edge of the support layer and hot pressing the sealant.

3. The method of claim 2, further comprising hot pressing the first and second electrodes, the support layer, and the sealant together into a sandwich.

4. A method for manufacturing a thermal/overheat sensor, comprising:
- dip coating a support layer using a molten state changing material;
- disposing a first and second aluminum plate electrodes on the support layer after dip coating; and
- sealing the support layer between the first and second aluminum plate electrodes, wherein sealing the support layer includes disposing a sealant on an exposed edge of the support layer and hot pressing the sealant.

5. The method of claim 4, further comprising hot pressing the first and second electrodes, the support layer, and the sealant together into a sandwich.

\* \* \* \* \*